United States Patent
Melman et al.

(10) Patent No.: US 10,761,601 B2
(45) Date of Patent: Sep. 1, 2020

(54) EYE TRACKING SYSTEM INCLUDING AN EYE TRACKER CAMERA AND A POSITIONING CAMERA

(71) Applicants: Controlrad Systems Inc., Radnor, PA (US); Haim Melman, Kfar Saba (IL)

(72) Inventors: Haim Melman, Kfar Saba (IL); Nir Eden, Haifa (IL)

(73) Assignee: CONTROLRAD SYSTEMS INC., Radnor, PA (US)

(*) Notice: Subject to any disclaimer, the term of this patent is extended or adjusted under 35 U.S.C. 154(b) by 0 days.

(21) Appl. No.: 15/559,050

(22) PCT Filed: Mar. 23, 2016

(86) PCT No.: PCT/IL2016/050308
§ 371 (c)(1),
(2) Date: Sep. 17, 2017

(87) PCT Pub. No.: WO2016/151581
PCT Pub. Date: Sep. 29, 2016

(65) Prior Publication Data
US 2018/0074581 A1  Mar. 15, 2018

Related U.S. Application Data

(60) Provisional application No. 62/136,643, filed on Mar. 23, 2015.

(51) Int. Cl.
*G09G 5/00* (2006.01)
*G06F 3/01* (2006.01)
(Continued)

(52) U.S. Cl.
CPC ......... *G06F 3/013* (2013.01); *G06K 9/00597* (2013.01); *G06K 9/00604* (2013.01);
(Continued)

(58) Field of Classification Search
None
See application file for complete search history.

(56) References Cited

U.S. PATENT DOCUMENTS

| 5,231,674 A | 7/1993 | Cleveland et al. |
| 6,373,961 B1 * | 4/2002 | Richardson ............. G06F 3/013 345/8 |

(Continued)

FOREIGN PATENT DOCUMENTS

| EP | 2709060 A1 | 3/2014 |
| EP | 2826414 A1 | 1/2015 |
| JP | 2012047945 A * | 3/2012 |

OTHER PUBLICATIONS

International Search Report and Written Opinion in PCT/IL2016/050308 dated Jul. 16, 2016.
(Continued)

*Primary Examiner* — Lunyi Lao
*Assistant Examiner* — Kirk W Hermann
(74) *Attorney, Agent, or Firm* — Manelli Selter PLLC; Edward Stemberger

(57) ABSTRACT

A system for evaluating a point of gaze of a user on an object, the system comprising: an eye tracker, comprising: at least one eye tracker camera associated with a first coordinate system; a light source; at least one computer; at least one positioning camera associated with a second coordinate system, the geometrical data of the object is stored in a storage device accessible to the at least one computer; wherein any combination of the at least one computer is configured to determine: a gaze line of the user relative to the first coordinate system; the position of the at least one eye tracker camera relative to the second coordinate system; the position of the object relative to the second coordinate system; and a gaze point, based on the gaze line in any coordinate system and the at least one object's position in the any coordinate system.

4 Claims, 12 Drawing Sheets

(51) Int. Cl.
    *G06K 9/00*     (2006.01)
    *G06T 7/80*     (2017.01)
    *G06T 7/73*     (2017.01)
    *G06K 9/20*     (2006.01)
    *G06K 9/32*     (2006.01)

(52) U.S. Cl.
    CPC ............. *G06K 9/2036* (2013.01); *G06T 7/74* (2017.01); *G06T 7/80* (2017.01); *G06K 2009/3291* (2013.01); *G06T 2207/10012* (2013.01); *G06T 2207/30201* (2013.01); *G06T 2207/30244* (2013.01)

(56) References Cited

U.S. PATENT DOCUMENTS

| | | | |
|---|---|---|---|
| 9,317,113 B1 * | 4/2016 | Karakotsios | G06F 3/013 |
| 2004/0196433 A1 | 10/2004 | Durnell | |
| 2010/0064244 A1 * | 3/2010 | Kilpatrick, II | G06F 1/1616 |
| | | | 715/773 |
| 2010/0321482 A1 * | 12/2010 | Cleveland | G06F 3/012 |
| | | | 348/78 |
| 2012/0294478 A1 * | 11/2012 | Publicover | G06K 9/00604 |
| | | | 382/103 |
| 2013/0095924 A1 * | 4/2013 | Geisner | G06F 3/012 |
| | | | 463/32 |
| 2014/0146156 A1 | 5/2014 | Strombom et al. | |
| 2014/0285432 A1 | 9/2014 | Guez et al. | |
| 2014/0357312 A1 * | 12/2014 | Davis | G06F 3/04842 |
| | | | 455/550.1 |
| 2015/0243036 A1 * | 8/2015 | Hoffmann | A61B 3/113 |
| | | | 382/103 |

OTHER PUBLICATIONS

European Search Report in application No. 16767873.9 dated Oct. 9, 2018.

* cited by examiner

EYE TRACKING SYSTEM INCLUDING AN EYE TRACKER CAMERA AND A POSITIONING CAMERA

CROSS-REFERENCE TO RELATED PATENT APPLICATIONS

This patent application claims priority from and is related to U.S.
Provisional Patent Application Ser. No. 62/136,643, filed Mar. 23, 2015, this U.S. Provisional Patent Application incorporated by reference in its entirety herein.

FIELD OF THE INVENTION

The present system and apparatus generally relate to eye tracking systems and in particular to eye tracking having system elements in variable spatial arrangements.

BACKGROUND

Eye tracking is a known art of which technologies and methods are described in "Eye Tracking Methodology: Theory and Practice" by Andrew Duchowski, ISBN 978-1-84628-608-7. The book describes various methods known in the art for computing a gazing direction from an image of the eye/s. Other sources that disclose use of eye tracking technology are also available.

One of the main applications of eye tracking devices is to provide the main point of gaze of a user on a display screen or on any other object. In some cases the point of gazed gaze is displayed on such a display screen and in some cases the gaze point location may be used to for other purposes, such as activation of a function.

Typical eye tracking systems for such purposes are designed to track the gaze point on the surface of a display screen with the eye tracker mounted at a fix location on the display (typically bottom-center of the display) and designed to track a user that is at a typical distance of 40-100 cm from the display. Such eye trackers are therefore designed also to track users that are typically 40-100 cm from the eye tracker.

These eye trackers allow users the freedom of motion within the head box of the eye tracker with typical size is 40×40×40 $cm^3$.

In various applications, such as surgical rooms, it is often desired to position the display at a distance larger than 100 cm from the user. Eye trackers that are designed to track a user at maximum 100 cm will not be able to track the user anymore when attached to a display that is further from the user than 100 cm.

There is a long felt need for a system which enables the usage of such eye trackers in situations where the display (or any other observed object) is farther away from the user than the maximum usable distance of the eye tracker from the user. The system of the present invention also enables non-fixed spatial relations between the eye tracker and the display (or the object) so that they can move one relative to the other and still maintain the gaze point tracking on the display screen.

In one example, the system of the present invention is intended to assist a user in a surgical procedure. In some arrangements of surgical environments, the space in the immediate vicinity of the user might be loaded with equipment to a degree that it is desired to move the monitor further away. If the distance between the user and the desired location of the monitor display becomes larger than current typical range of existing eye trackers, proper use of these eye trackers will be impaired.

SUMMARY

The current invention provides the freedom of removing the fixed position of the eye tracker relative to the monitor (or object) and allows for versatile positioning and change of position at any time without disturbing the gaze point tracking. The system includes a camera and associated computer configured to track the movements of the user's eye, a camera and associated computer configured to track a monitor screen (or any other objects) and one or more computers configured to control operation of the system. All computer functionality can be handled in a single computer or in any combination in any number of multiple computers. The computers, in addition to controlling the system, can be configured or include a mechanism adapted to receive the data from the camera capturing the movements of the user's eye and calculate the line of gaze of the user (or receive line of gaze of user from the eye tracker). The monitor tracker can locate and identify the monitor position in space (and particularly, the image area displayed within). The computer can be configured to calculate the point of incidence of the line of gaze on the monitor screen area, so to provide the gaze point of the user on the monitor screen. In some examples, a number of computers can participate in the process and the calculation tasks of the computer can be split between multiple computers.

Such a system provides the gaze point of the user on the monitor display screen with flexible geometry relations between the user, tracking system and monitor. The system can also support multiple monitors and eye tracking systems. The system changes the existing perceptions according to which the monitor screen should be located or positioned in close proximity to the user's eye and in fixed relation to the eye tracker, with the eye tracker typically fixed to the bottom of the monitor. With the present invention the location or positioning of the monitor screen becomes flexible, since the monitor screen now can be positioned at a large distance from the user.

In one example of the invention an object tracker camera is mounted in a fixed position relative to the eye tracker so to track the object, at least one of the object and the eye tracker are movable relative to each other and, in case of a monitor, the gazing point can be marked on the display.

In another example of the invention, an object tracker camera is mounted in a fixed position relative to the object so to track the eye tracker, at least one of the object and the eye tracker are movable relative to each other and, in case of a monitor, the gazing point can be marked on the display.

In yet another example of the invention, an object tracker camera is located in any location and is configured to track both the object and the eye tracker, at least one of the object, the object tracker and the eye tracker are movable relative to each other and, in case of a monitor, the gazing point can be marked on the display.

The invention further provides methods for calibration using targets (fiducials) that can be displayed by a monitor or located in various locations in the room.

The invention particularly enables calibration of a range that is larger than the range of the display as used for tracking by positioning the display relatively near the eye tracker so to cover the eye tracker tracking range.

The invention particularly enables calibration of a range that is larger than the range of the display as used for tracking by positioning the display in multiple locations relative to the eye tracker so to cover the eye tracker tracking range.

Calibration targets displayed in various locations in the room might comprise any of specific target shapes mounted around the room, light sources mounted around the room and target projected on different fixed elements such as walls and cabinets in the room, simultaneously or one after the other, using one type or a mix of multiple types of targets.

The invention provides also for tracking the gaze point over multiple objects and, in the case of monitors, multiple monitors, all located in different locations and movable without disturbing the gaze point tracking of one or any number of objects (and monitors).

The invention also provided a system and methods for incorporating multiple object tracker (or object trackers cameras).

The invention also provides system and methods for incorporating multiple eye trackers.

Stereo imaging and conventional triangulation methods can be used to set a 3D coordinate system to describe the positions and orientation of the objects in a coordinate system.

A single camera can be used to determine position and orientation of an object in a coordination system using 2D-3D pose methods such as described in Rosenhahn, B. "Foundations about 2D-3D Pose Estimation" and Wikipedia: "https://en.wikipedia.org/wiki/3D_pose_estimation" and Rosenhahen, B., Sommer G.: "Adaptive pose estimation for different correcsponding entities". In Van Gool, L. (ed) DAGM 2002, vol. 2449, pp. 265-273. Springer, Heidelberg (2002) and Daniel F. Dementhon, Larry S. Davis, "Model-based object pose in 25 lines of code", International Journal of Computer Vision June 1995, Volume 15, Issue 1, pp 123-141.

According to an aspect of the present invention there is provided a system for evaluating a point of gaze of a user on an object, the system comprising: at least one eye tracker camera and at least one positioning camera, the at least one eye tracker camera and the at least one positioning camera are configured to be arranged in fixed positions relative to each other; at least one light source configured to provide corneal reflection from at least one of the user's eyes; at least one computer; and at least one object, wherein the geometrical data of the at least one object is stored in a storage device accessible to the at least one computer; wherein any combination of the at least one computer is configured to determine: (a) a gaze line of the user relative to a coordinate system, based on at least one image received from the at least one eye tracker camera; (b) the position of the at least one object relative to the coordinate system, based on an image received from the at least one positioning camera; and (c) a gaze point, based on the gaze line, the at least one object position and the at least one object geometrical data.

The at least one object may comprise at least two objects; the at least two objects may be configured to be arranged in fixed positions relative to each other.

The at least one object may be a monitor; the monitor may be configured to display at least one marker.

The at least one positioning camera may comprise at least two positioning cameras; the at least two positioning cameras may be configured to enable determining the position of the at least one object using stereoscopic methods.

According to another aspect of the present invention there is provided a system for evaluating a point of gaze of a user on an object, the system comprising: at least one eye tracker camera associated with a first coordinate system that is fixed relative to the at least one eye tracker camera; at least one light source configured to provide corneal reflection from at least one of the user's eyes; at least one computer; at least one object, wherein the geometrical data of the at least one object is stored in a storage device accessible to the at least one computer; and at least one positioning camera configured to be arranged in a fixed position relative to the at least one object; the at least one positioning camera configured to be associated with a second coordinate system that is fixed relative to the at least one positioning camera; wherein any combination of the at least one computer is configured to determine: (a) a gaze line of the user relative to the first coordinate system, based on at least one image received from the at least one eye tracker camera; (b) the position of the at least one eye tracker camera relative to the second coordinate system, thereby determining the position of one coordinate system in the other coordinate system, based on at least one image received from the at least one positioning camera; and (c) a gaze point, based on the gaze line in any coordinate system, the at least one object's position in any coordinate system and the at least one object's geometrical data.

The at least one object may comprise at least two objects; wherein the at least two objects may be configured to be arranged in fixed positions relative to each other.

The at least one positioning camera may comprise at least two positioning cameras; the at least two positioning cameras may be configured to enable determining the position of the at least one object using stereoscopic methods.

According to another aspect of the present invention there is provided a system for evaluating a point of gaze of a user on an object, the system comprising: an eye tracker, comprising: at least one eye tracker camera associated with a first coordinate system that is fixed relative to the at least one eye tracker camera; a light source configured to provide corneal reflection from at least one of the user's eyes; and at least one computer; at least one positioning camera associated with a second coordinate system that is fixed relative to the at least one positioning camera; and at least one object, wherein the geometrical data of the at least one object is stored in a storage device accessible to the at least one computer; wherein any combination of the at least one computer is configured to determine: (a) a gaze line of the user relative to the first coordinate system, based on an image received from the at least one eye tracker camera; (b) the position of the at least one eye tracker camera relative to the second coordinate system, thereby determining the position of one coordinate system in the other coordinate system, based on an image received from the at least one positioning camera; (c) the position of the at least one object relative to the second coordinate system based on the image from the at least one positioning camera and the stored geometrical data of the at least one object; and (d) a gaze point, based on the gaze line in any coordinate system and the at least one object's position in any coordinate system.

A first positioning camera may be configured to determine the position of the at least one eye tracker camera, the first positioning camera associated with a second coordinate system fixed relative to the first positioning camera; a second positioning camera may be configured to determine the position of the at least one object, the second positioning camera associated with a third coordinate system fixed relative to the second positioning camera; and the intersection of a gaze line determined by the at least one eye tracker with the at least one object may be determined based on a transformation between the second coordinate system and the third coordinate system.

The at least one object may comprise at least two objects; wherein the at least two objects may be configured to be arranged in fixed positions relative to each other.

The at least one object may be a monitor; the monitor may be configured to display at least one marker.

The at least one positioning camera may comprise at least two positioning cameras; the at least two positioning cameras may be configured to enable determining the position of the at least one object using stereoscopic methods.

According to another aspect of the present invention there is provided a method of calibrating and using an eye tracker configured to track a gaze point of a user on a display, wherein the display is configured to be positioned in at least one position different from a calibration position relative to the eye tracker for the tracking, the method comprising the steps of: placing the display close to the eye tracker thereby covering the entire area covered by the gaze range of the eye tracker; determining the position of the display and the eye tracker relative to each other; displaying a plurality of targets on the display, each of the plurality of targets provides calibration parameters of a gaze line for this target in a first coordinate system, based on the relative position of the eye tracker and the display, wherein the plurality of targets cover the area covered by the gaze range of the eye tracker; storing the calibration data; positioning at least one of the display and the eye tracker in a usage position that is different from the calibration position relative to each other; employing at least one positioning camera thereby determining the position of the display and the eye tracker relative to each other; determining a gaze line in the first coordinate system based on the calibration data; and determining an intersection of the gaze line with the display in any coordinate system based on the relative position of the display and the eye tracker as determined based on at least one image from the positioning camera, thereby providing the gaze point on the display.

Determining the position of the display and the eye tracker relative to each other may be performed using a positioning camera.

According to another aspect of the present invention there is provided a method of calibrating an eye tracker for use with a display, the eye tracker and the display are configured to be positioned relative to each other in at least two different positions for tracking a gaze point on the display, the method comprising the steps of: placing the display in a first position thereby covering at least a part of the angles available by the gaze range of the eye tracker; determining the position of the display and the eye tracker relative to each other; displaying a plurality of targets on the display, each of the plurality of targets provides calibration parameters of a gaze line for this target in a first coordinate system, based on the relative position of the eye tracker and the display, wherein the plurality of targets cover at least a part of the area of the display; repeating at least once, the above steps for another position of the display thereby calibrating additional gaze lines available by the eye tracker's gaze range; and storing the calibration data.

Determining the position of the display and the eye tracker relative to each other may be performed using a positioning camera.

According to another aspect of the present invention there is provided a method for calibrating an eye tracker, the method comprising the steps of: drawing the attention of a user to a calibration target; employing at least one positioning camera and at least one computer thereby determining the position of the calibration target and the eye tracker coordinate system relative to each other; determining the calibration parameters of a gaze line, to the calibration target, in a first coordinate system; repeating the above steps thereby providing a desired part of a gaze range and calibration targets distribution; and storing the calibration data.

The calibration target may comprise at least one LED.

Drawing the attention of the user may comprise turning ON at least one of the at least one LED of a desired target and turning OFF the other LEDs of other targets.

The target may be distinguished by any of ON/OFF sequence pattern, color and shape defined by its at least one LED.

The shape of a target may be determined by the arrangement of the at least one LED constituting the target, the arrangement comprises any of spatial distribution, ON/OFF sequence and color.

The calibration target may comprise items.

Drawing the attention of the user may comprise illuminating an item of a desired target.

The targets may be distinguished by any of ON/OFF sequence pattern of illumination, color and shape.

The target may be projected on a substrate using at least one projector.

Drawing the attention of the user may comprise projecting a desired target.

The targets may be distinguished by any of ON/OFF sequence pattern of the projector, image color and image shape.

After the calibration, the eye tracker position may be changed so that at least one target falls in a position, in the gaze range, that did not have a target during the calibration; the method may further comprise repeating the calibration process using the at least one target.

The at least one positioning camera may be configured to capture at least a part of the targets.

A computer may be configured to determine the position of at least one target that is not captured by the positioning camera, and the eye tracker coordinate system relative to each other, based on at least one image received from the at least one positioning camera and the data of the spatial arrangement of at least a part of the targets that includes at least a part of the targets captured by the at least one positioning camera and the at least one target that is not captured by the at least one positioning camera.

According to another aspect of the present invention there is provided an eye tracker for use with corneal reflection comprising: an eye tracker camera; and at least two light sources configured to generate corneal reflections; at least a first and a second light sources of the at least two light sources are configured to be separated in position and each configured to provide a corneal reflection for at least one same gaze line; the first light source is configured to be turned ON and the second light source is configured to be turned OFF; in case the corneal reflection of the first light source is not detectable by the eye tracker, the first light source is configured to be turned OFF and the second light source is configured to be turned ON.

BRIEF DESCRIPTION OF THE DRAWINGS

For better understanding of the invention and to show how the same may be carried into effect, reference will now be made, purely by way of example, to the accompanying drawings.

The present system and method will be described with reference to accompanying drawings, in which the same reference numeral is for common elements in the various figures.

The cameras and monitors in the figures are connected to the computer or to each other by cable or by wireless methods, directly or through other means so as to facilitate communication as described in reference to the figures. For the sake of clarity these connections are not shown explicitly in the figures. The connections and communication means are generally known in the art. The same approach is made for communication means of the computer with other elements such as active calibration targets, projectors, monitors and any other communication means between two or more items that are present in the description but not necessarily shown explicitly in the figures.

Figure 1A:
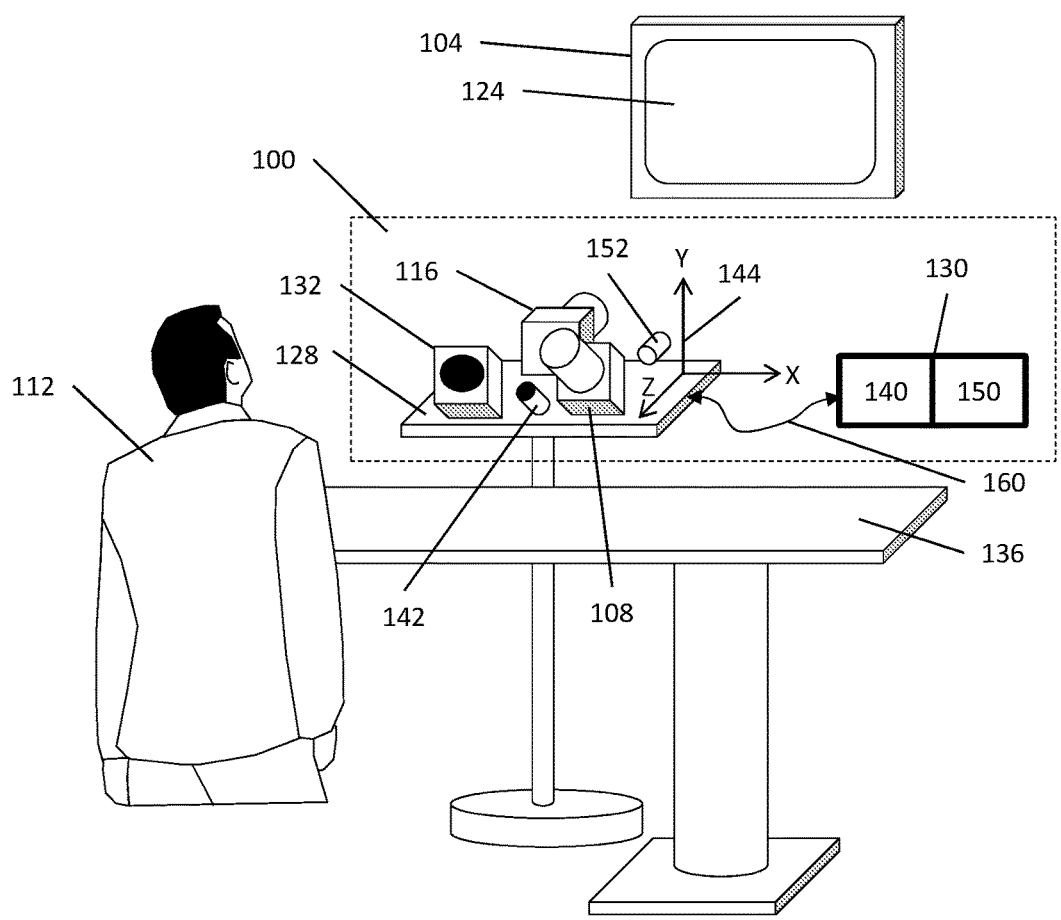
Figure 1B:
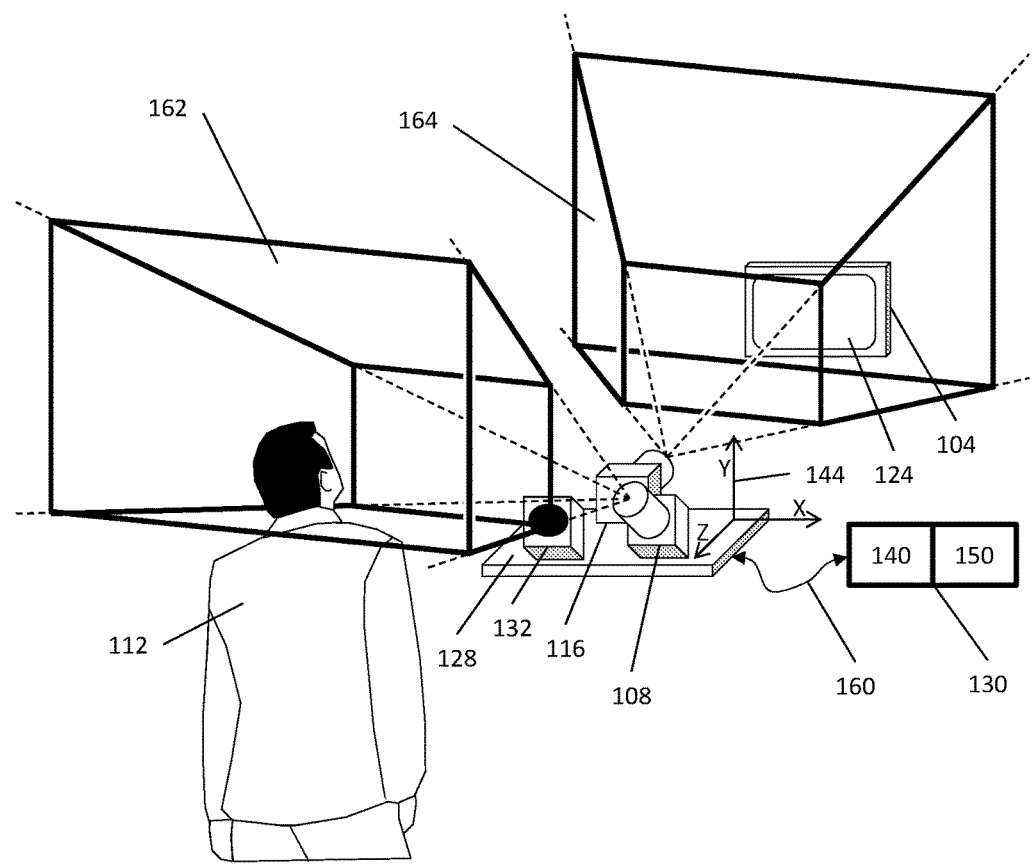
Figure 2A:
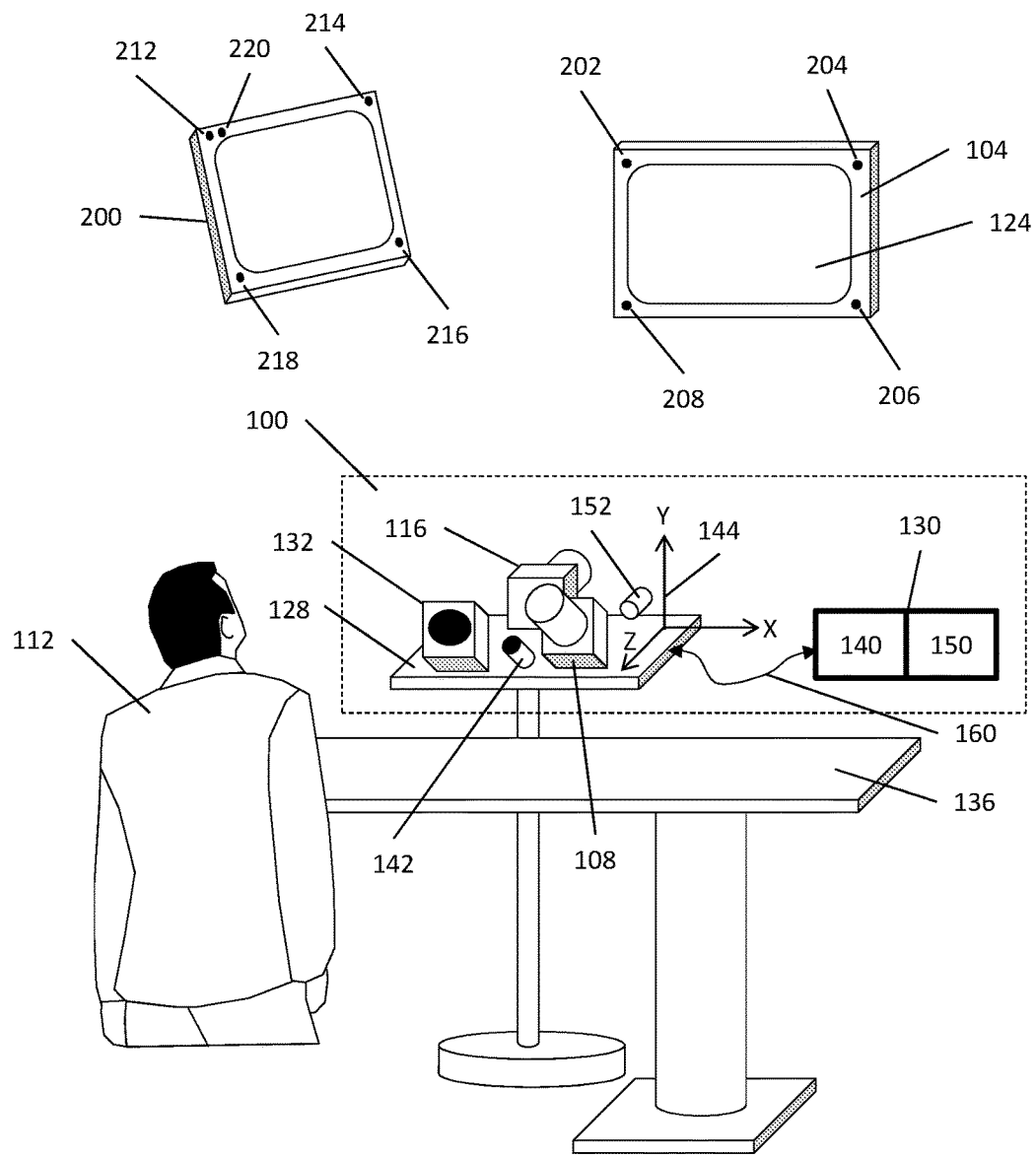
Figure 2B:
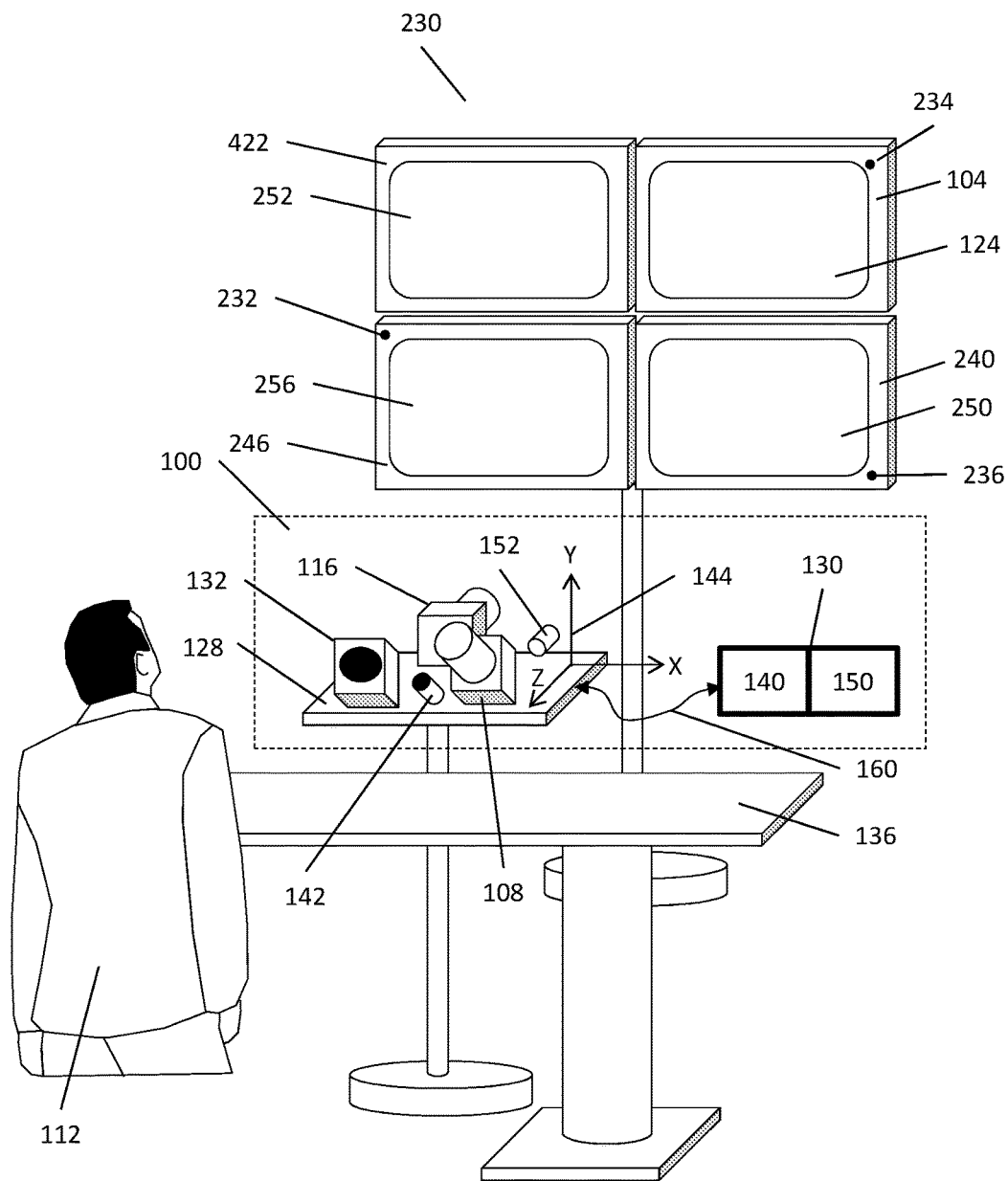
Figure 3A:
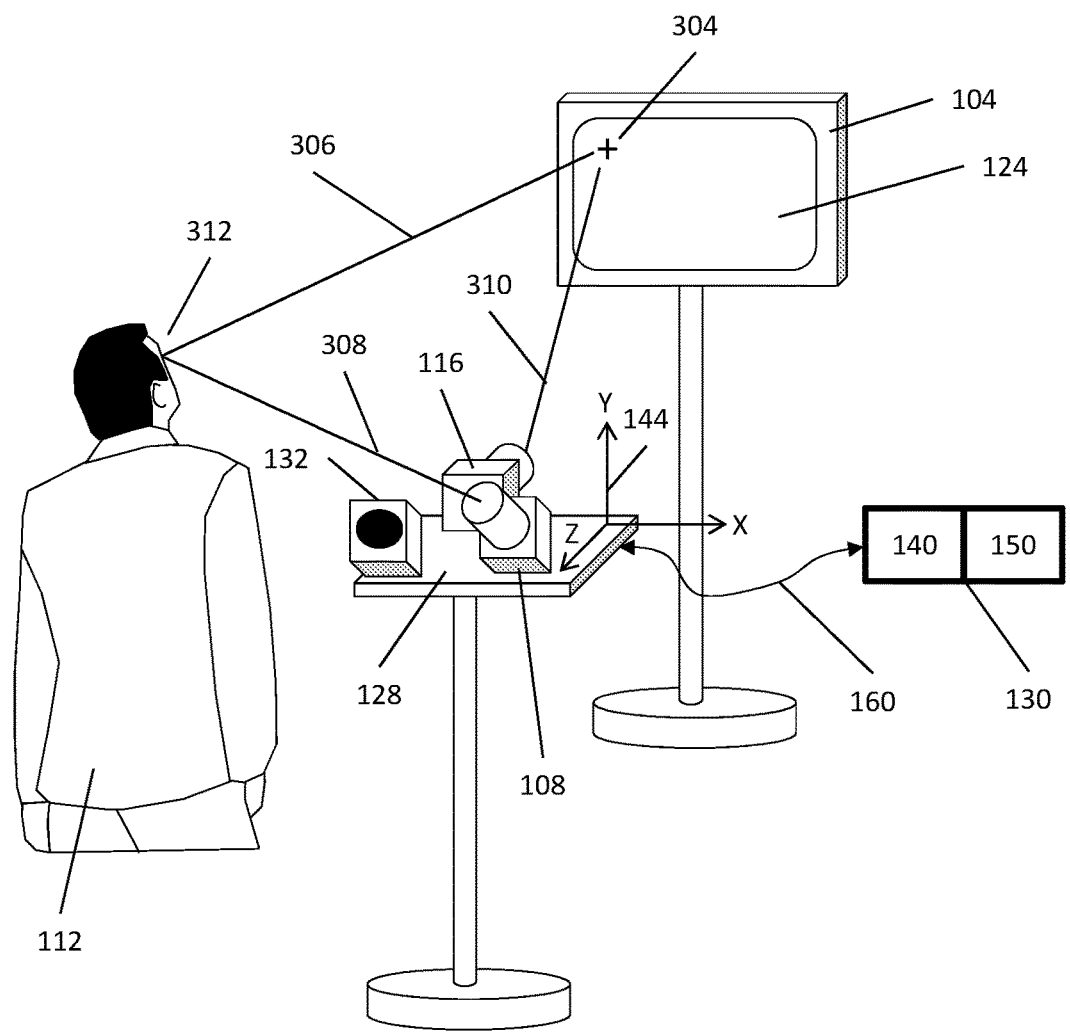
Figure 3B:
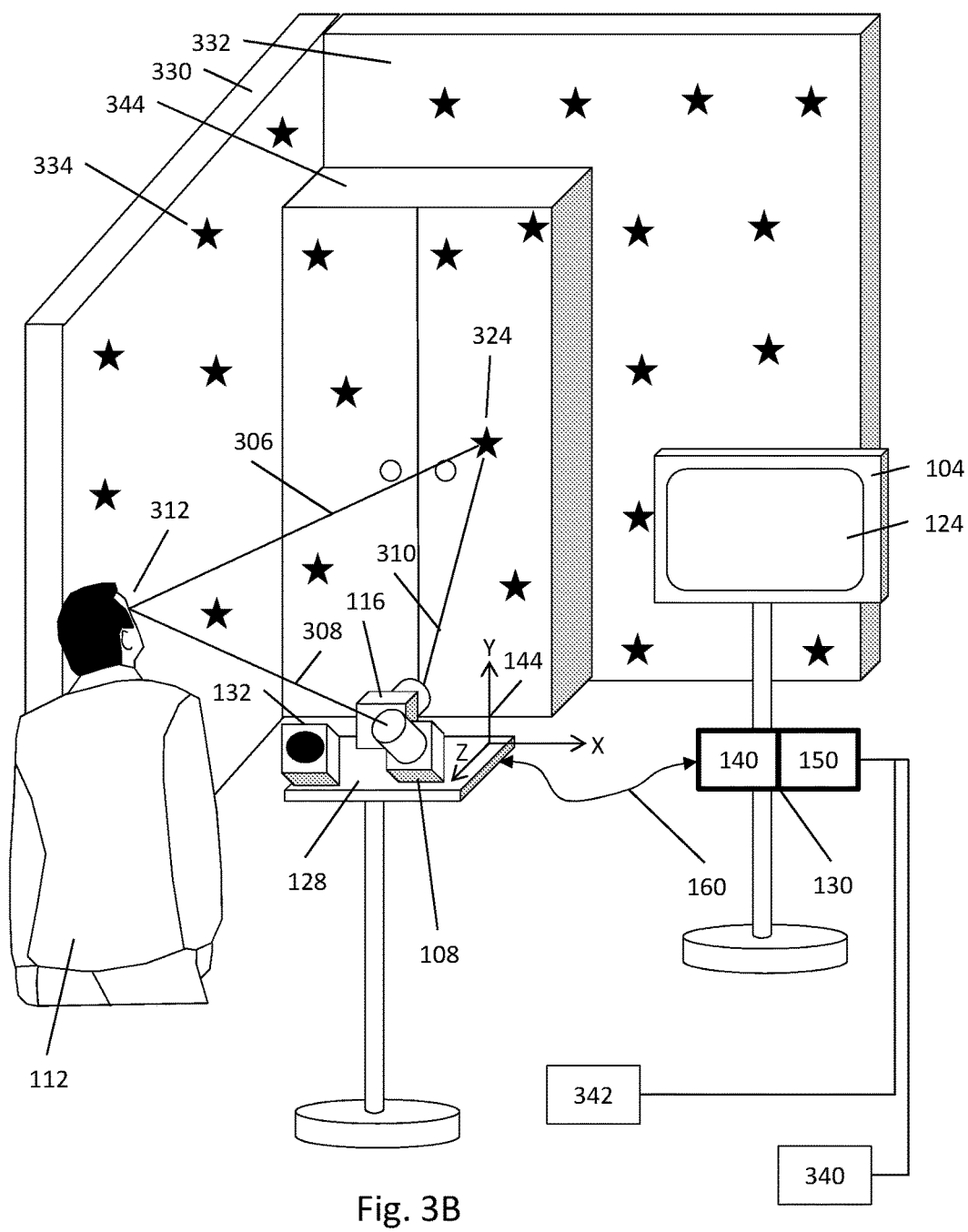
Figure 4:
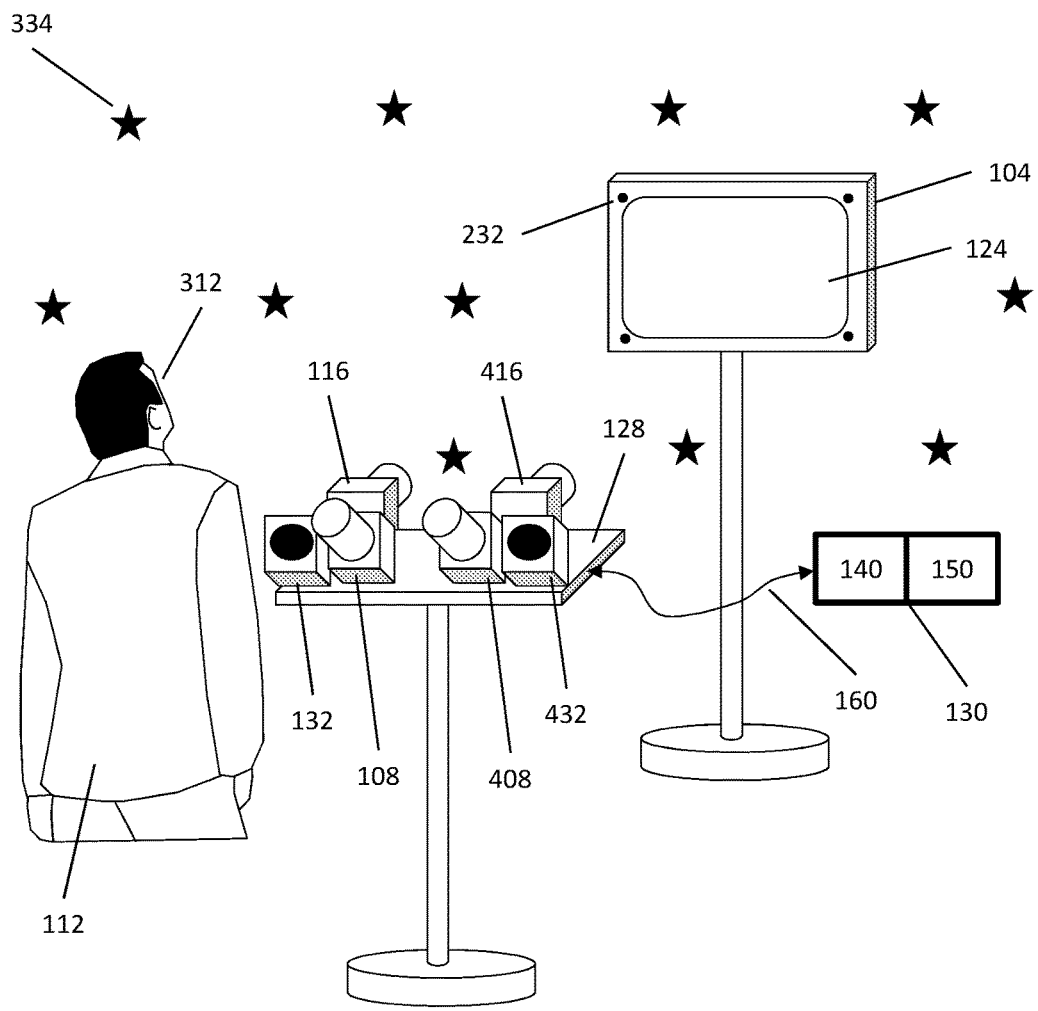
Figure 5:
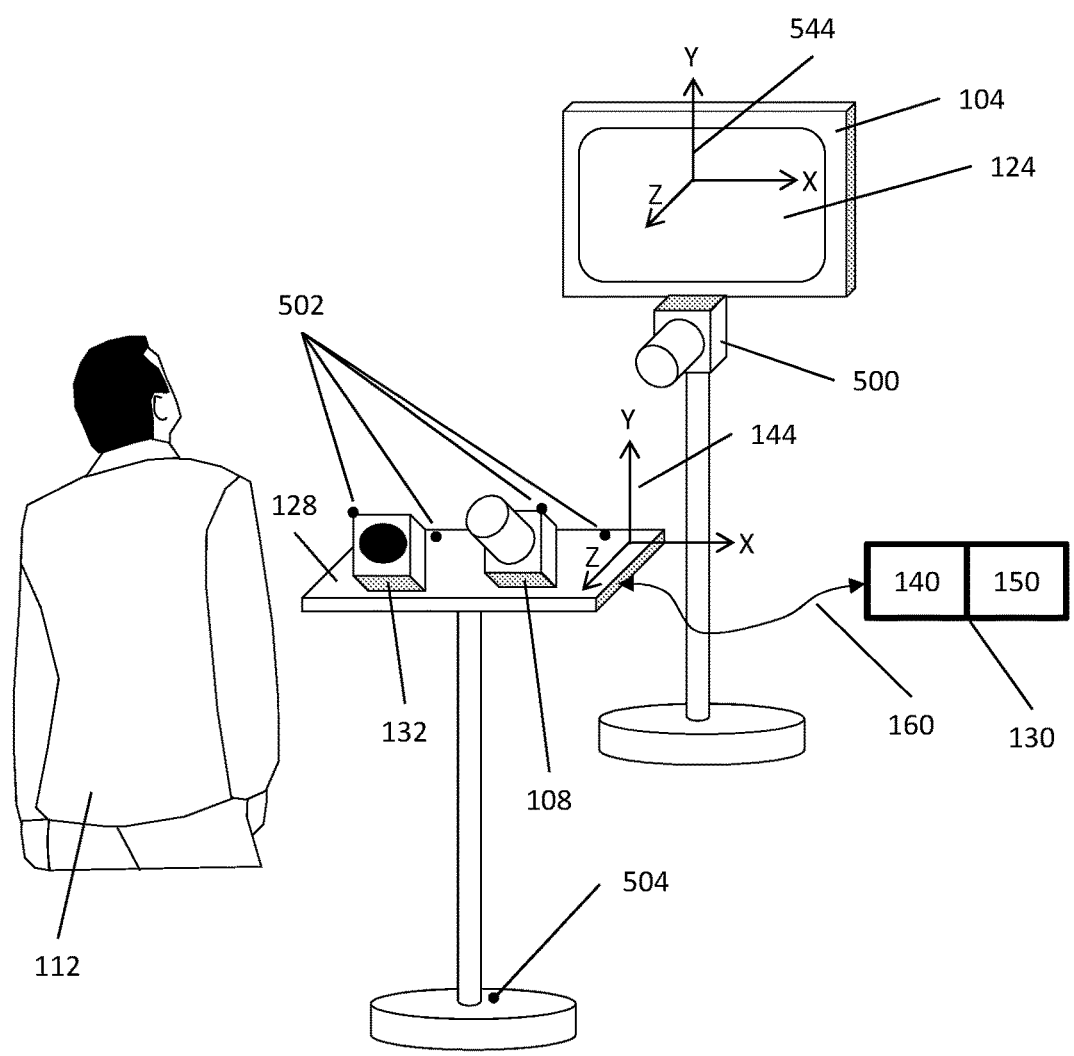
Figure 6A:
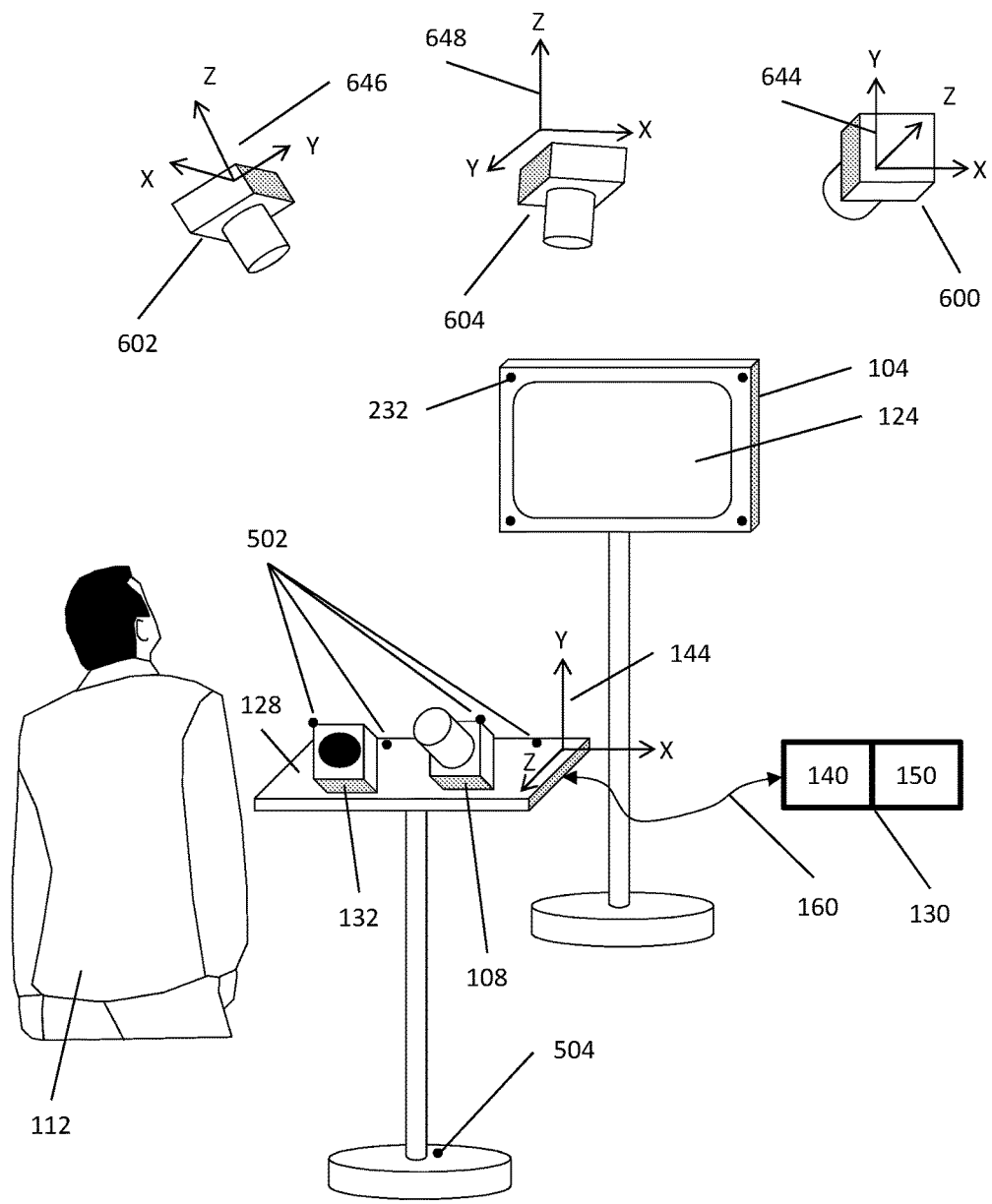
Figure 6B:
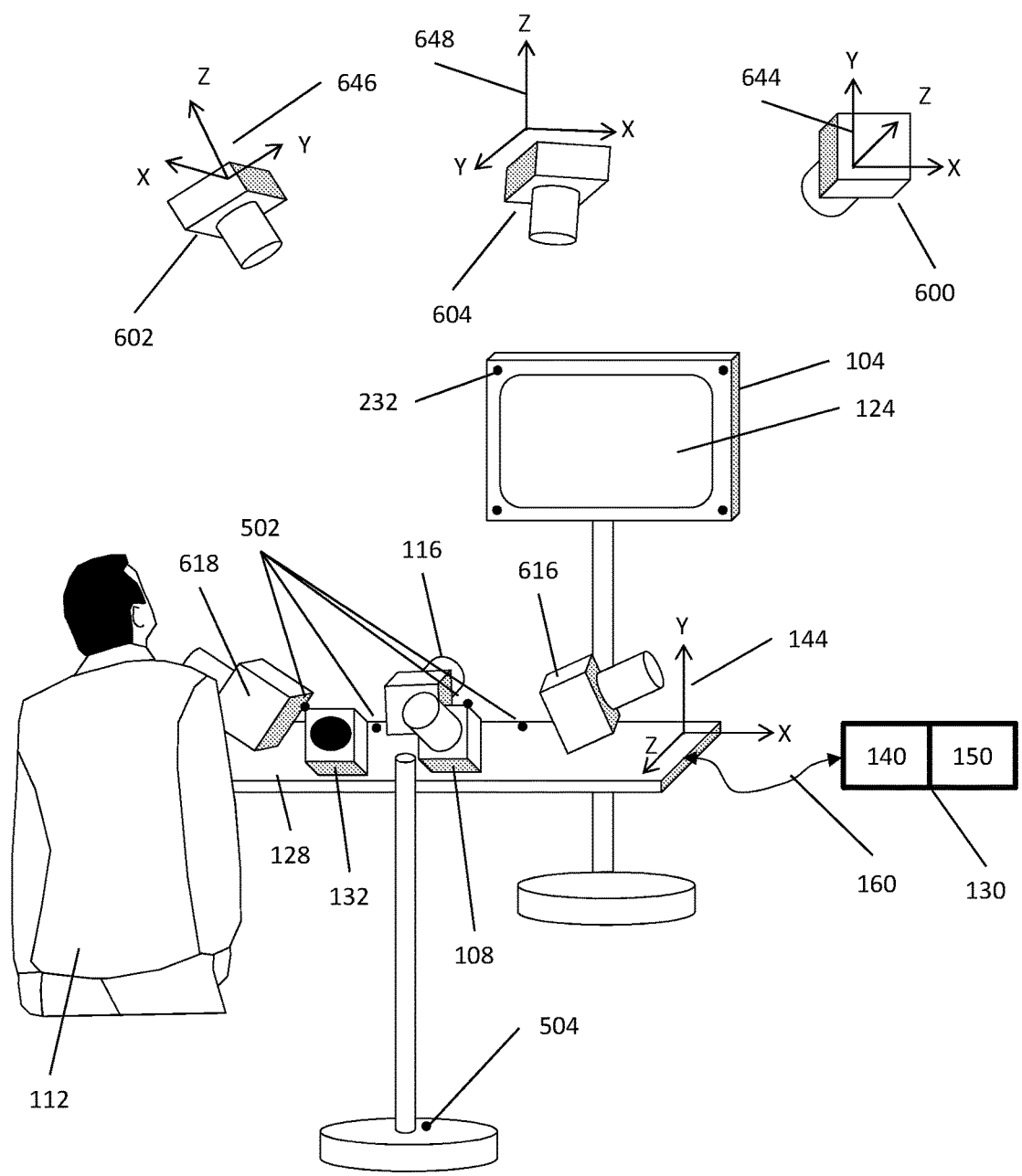
Figure 7:
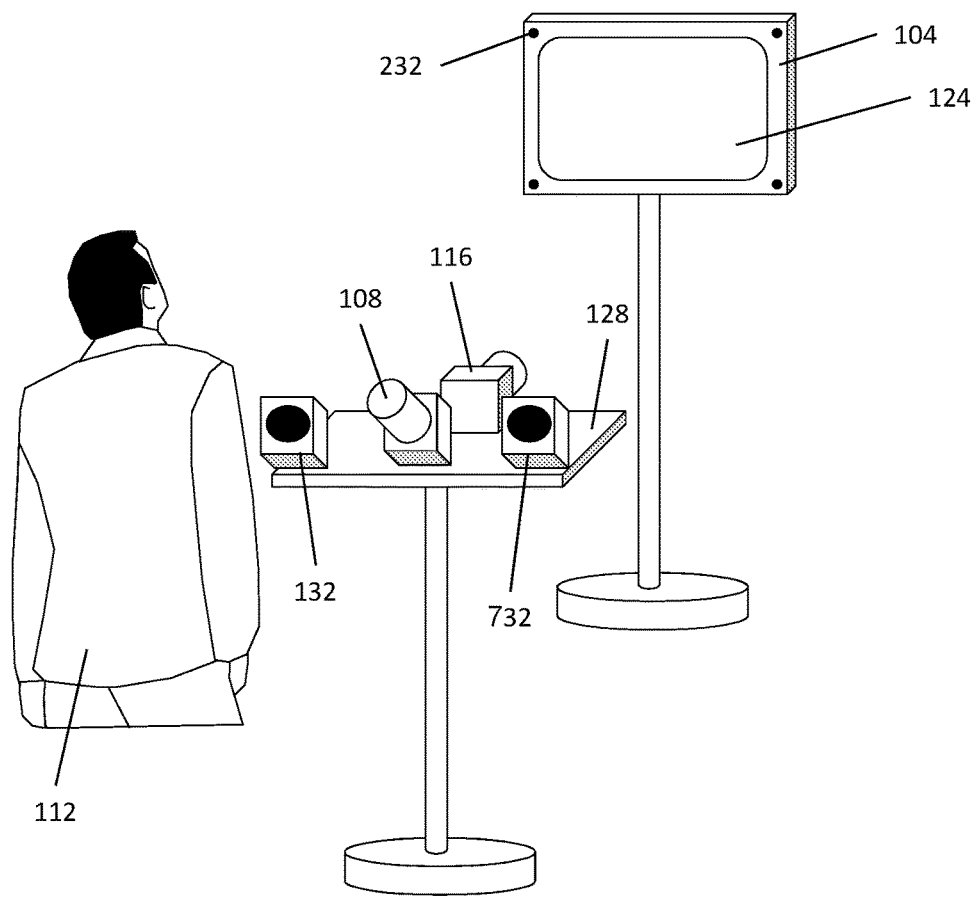
Figure 8:
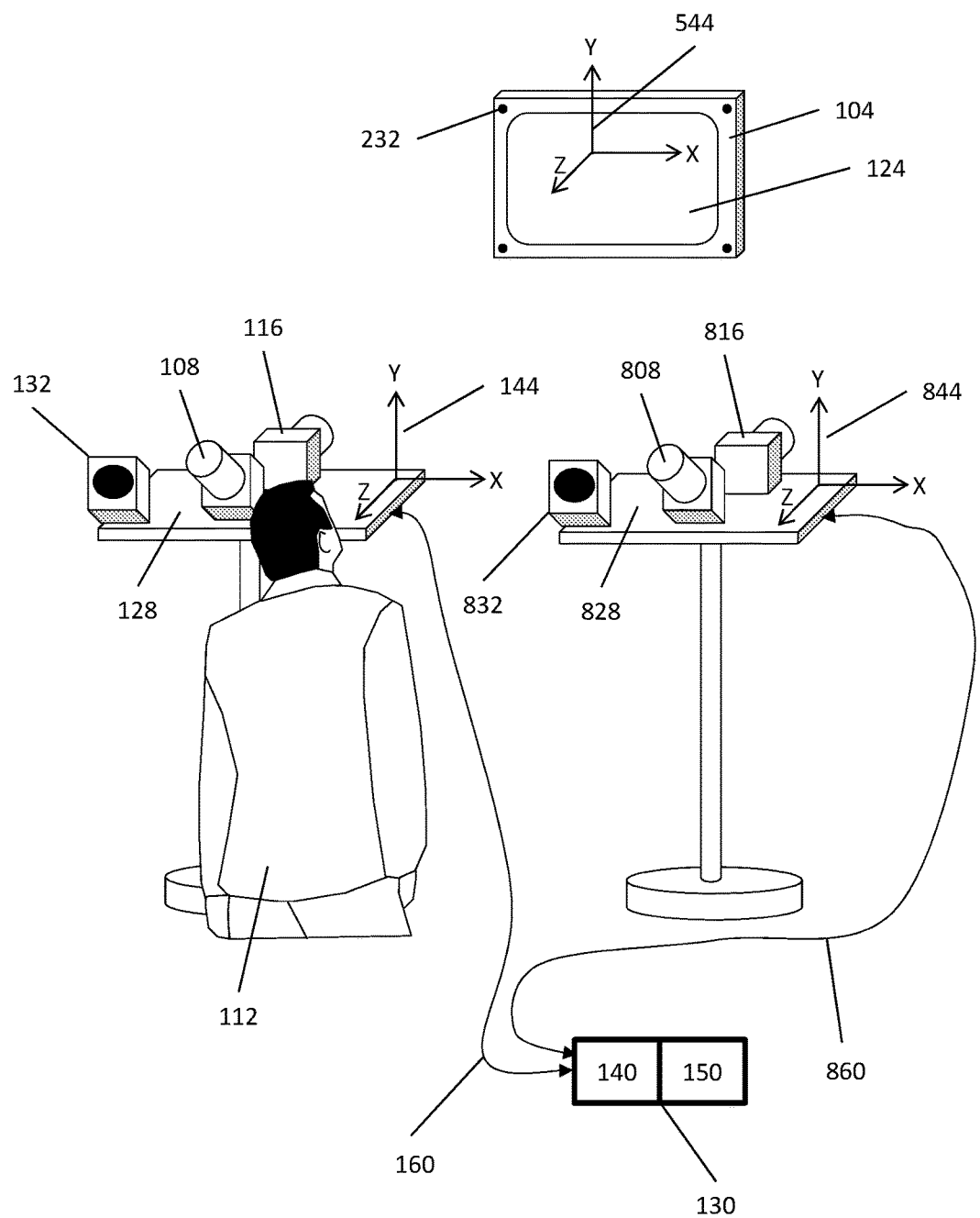

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1A is an illustration of a tracking system according to an example;

FIG. 1B is an illustration of a tracking system according to an example;

FIG. 2A is an illustration of a tracking system according to an example including two tracked objects;

FIG. 2B is an illustration of a tracking system according to an example including tracked object constructed of multiple items;

FIG. 3A is an illustration of calibration of the tracking system according to an example;

FIG. 3B is an illustration of calibration of the tracking system according to an example;

FIG. 4 is an illustration of a tracking system according to an example based on stereo imaging;

FIG. 5 is an illustration of a tracking system according to an example with a positioning camera included in the object assembly;

FIG. 6A is an illustration of a tracking system according to an example where one or more positioning cameras are mounted independently of other components of the system;

FIG. 6B is an illustration of a tracking system according to an example where one or more positioning cameras are mounted in a specific position relative to the eye tracker cameras;

FIG. 7 is an illustration of a tracking system according to an example including multiple corneal reflection light sources; and FIG. 8 is an illustration of a tracking system according to an example including multiple eye trackers.

GLOSSARY

Line of sight/line of gaze/gazing line/gaze line: an imaginary line extending through the user eye and through the point which the user is looking at.

Gazing point/gaze point: the point at which the user is looking, i.e. the intersection of a gazing line with a point of an object.

Gaze angle: The angle with vertex at the pupil of the user and one ray passing through the gaze point and the other ray passing through the center of the lens of the eye tracker.

Eye tracking: the action of determining the line of sight of a user.

Eye tracker: a device, such as for example a camera and associated illumination source that can perform eye tracking, including algorithm and computer capabilities to enable gaze line calculation.

Head box: the space intended to include at least one eye of the user.

Eye tracker tracking range/tracking range: the solid angle defined by the entire set of gaze lines that can be tracked.

Item: anything constructed of physical material.

Object: an item intended to be a subject of a user's gaze.

Object tracker: a system intended to track an object, typically including at least one camera and computing capabilities.

Object box: the space intended to include objects for which the gazing point is calculated. It is bound by the field of view of the at least one camera of the object tracker and the at least one camera position in space.

Screen/Display: a 2-dimentional area used to display images, text, numbers, graphical elements etc.

Monitor: a 3-dimensional item that includes a screen/display.

Monitor tracker: a system intended to track a monitor, typically including at least one camera and some computing capabilities. This is a specific implementation of an object tracker.

User: anyone using the system (may also be referred to as an operator, physician or surgeon).

Position (of an item in a coordinate system): the coordinates of at least one point of the item in the coordinate system and the orientation of the item relative to the coordinate system or, alternatively, the coordinates of at least 3 points of an item that are not on a straight line in the coordinate system.

Light: electromagnetic radiation that can be handled using common electro-optical components (such as lenses, prisms and sensors), including radiation in the visible range and also outside the visible range (such as infra-red light).

Eye tracking camera: a camera intended to capture images including the user's eye or eyes.

Positioning camera: a camera intended to capture images including any objects and items (typically, objects of interest, such as a monitor and associated display, and markers when available).

DETAILED DESCRIPTION OF PREFERRED EMBODIMENTS

The description hereinbelow will be made mostly in reference to an object that is a monitor to simplify the description and concentrate on one example but it would be appreciated that the description applies to any object. The description is also made with an example of an operating room but the invention is applicable to any environment that utilizes eye tracking in reference to objects.

FIG. 1A is an illustration of a tracking system according to an embodiments of the present invention. The tracking system 100 is configured to calculate the point of incidence of the line of gaze (of a user) and the monitor 104 (and screen 124 contained within) so as to provide the gazing point on the monitor screen. The tracking system 100 includes an eye tracking camera 108 configured to capture images of a volume that includes user 112 eyes, illumination source 132 and computer 130. Computer 130 can be configured to analyze images received from camera 108 and provide gazing line of user 112 relative to a coordinate system, in this example: coordinate system 144. Camera 116 is configured to track the space enclosing the objects, in this example: monitor 104. Camera 108, camera 116 and illumination source 132 are mounted on a support or platform 128. In this example coordinate system 144 is fixed relative to support 128, camera 108, camera 116 and illumination 132. Illumination source 132 can be configured to support different tasks such as for example, corneal reflection for eye tracking. Coordinate system 144 may be the coordinate system of any of the cameras 108 and 116, illumination source 132 or support 128. There can also be an arbitrary coordinate system that is constant, for example, relative to a camera or cameras. Illumination source 142 can be added and can be configured to provide facial illumination for facial features detection and recognition. Illumination source 142 can be, for example, FaceSDK, commercially available from Luxand, Inc., Alexandria, USA. Illumination source 142 can be mounted on support 128 but it can also be mounted in other locations. Illumination source 152 can be added and can be configured to illuminate the space enclosing monitor 104 and other objects visible by camera 116 so as to facilitate operation of camera 116 to provide images of sufficiently illuminated objects. Illumination source 152 can be mounted on support 128, but it can also be mounted in other locations. Camera 108 is configured to provide an image of user's 112 eyes and provide the image to computer 130. Camera 108 is fixed in coordinate system 144, although the camera can have pan and tilt functions. Based on image analysis performed in computer 130, computer 130 can provide the gaze line relative to the coordinate system 144 using transformation between known coordinate system of camera 108 and coordinate system 144, including known parameters of pan and tilt if used. Typically, user 112 would perform a surgical procedure and observe the progress of the surgical procedure on screen 124 of monitor 104 or perform another action while observing screen 124.

Tracking system 100 includes a camera 116 that is configured to provide images of a volume that may contain objects of interest to the user, or objects at which the user may look. This volume may include monitor 104, additional monitors and other objects located in the volume. Camera 116 is also mounted on support 128 in a known position in coordinate system 144 so that points given in the coordinate system of cameras 116 can be known also in coordinate system 144 using a known transformation between the coordinate systems. Camera 116 in cooperation with computer 130 can make possible for computer 130 to provide monitor 104 coordinates and coordinates of other monitors and objects relative to coordinate system 144. In some cases object recognition algorithms can be used in computer 130 and in some cases the objects may be equipped with specific identifiers to support simpler and faster image recognition and image recognition algorithms in computer 130 and identify the objects and their position information in coordinate system 144. In some examples, computer 130 can be configured to extract coordinates of image elements displayed on the monitor screen 124, relative to coordinate system 144. Computer 130 can be configured to receive and analyze the images displayed on monitor screen 124 and thereby provide the plane and the borders of monitor screen 124 relative to coordinate system 144. The monitor tracker can also include one or more additional illumination sources (not shown in FIG. 1) to provide camera 116 with a good visibility of the objects present in the volume covered by camera 116.

Camera 108 and camera 116 are configured to communicate with computer 130 through communication line 160, which can be a hard wired line or a wireless communication line. The hard wired or wireless communication line is not limited in length and computer 130 can be placed anywhere. Any one of illumination sources 132, 142 and 152 can also be connected to computer 130 that can be configured to control the intensity of any one of the illumination sources or switch the illumination sources ON/OFF. In the example of an operating room, operating table 136 is typically located between user 112 and support 128. Each of illuminations 142 and 152 can also consist of multiple illumination units located in multiple locations so as to provide for different needs such as higher illumination intensity, reduce shadows and overcome obscuring objects. Monitor 104 or other monitors or objects of interest would typically be located in the space behind camera 116, in direction further away from the user.

It would be appreciated that coordinate system 144 is provided as an example and it can also be the coordinate system of camera 108 or camera 116 or any other coordinate system that is fixed relative to the cameras 108 and 116. The cameras may be mounted in a fixed position relative to each other in any way.

FIG. 1B is an additional illustration of the system of FIG. 1A where most of the system 100 components have been removed from the drawing to provide better clarity and understanding of the new elements presented in FIG. 1B. Camera 108 is shown here with its head box 162. Head box 162 is the volume in which camera 108 can capture images, including image of user 112, so that computer 130 can use these images to provide information such as line of sight of user 112 or facial recognition data relative to coordinate system 144. Head box 162 is defined by parameters such as sensor size and resolution of camera 108, focal length of the lenses used with camera 108, depth of field and camera 108 focusing capabilities, etc. In some camera configurations, zoom, pan and tilt can be available to enlarge the head box.

Object box 164 is the volume in which camera 116 can capture images of objects such as for example, monitor 104 so that computer 130 can use these images to provide information such as monitor 104 and screen 124 position relative to coordinate system 144. The dimensions of object box 164 are dependent on parameters of camera 116 in the same way as head box 162 dimensions are dependent on the parameters of camera 108.

Illumination sources 142 and 152 facilitating operation of tracking system 100 (FIG. 1A) can also be mounted on support 128 although in some examples these illumination sources can be mounted on a ceiling or wall or other locations, or not used at all. Monitor 104 can also be mounted on a support, mounted on a cart, attached to the ceiling of the operating room, hung on a wall, or mounted on a movable suspension. The distance between camera 116 and monitor 104 (or another tracked object in object box 164) is limited only by the performance of camera 116 and the desired accuracy in determining the position of a gazing point on the object. For example, the distance can be 1.5 meters, 2 meters, 4 meters or 6 meters; actually any distance. In the same way, the distance between camera 108 (the eye tracking camera) and monitor 104 (or another tracked object in object box 164) is limited only by the performance of camera 116 and the desired accuracy in determining the position of a gazing point on the object. For example, the distance can be 1.5 meters, 2 meters, 4 meters or 6 meters; actually any distance. Pan and tilt can also be used with camera 116 in the same way as described above in reference to camera 108 so as to increase the width and height of the object box and still allow computer 130 to determine the position of objects in coordinate system 144 using known values of pan and tilt, thus knowing the coordinate transformation between camera 116 coordinate system and coordinate system 144. It would be appreciated that also the distance between camera 108 and camera 116 can be fixed to any distance and any relative location limited only by the performance of the eye tracker, such as maximum trackable gaze angle.

The position of any object is generally established by its coordinates in a specified coordinate system. In one example, support 128 provides for a reference coordinate system, schematically shown by arrows of 144. Coordinate system 144 is fixed relative to camera 108, camera 116 and illumination source 142. Coordinates of the user and other subjects and objects in the operating room can also be determined in coordinate system 144 by coordinate systems transformation from the coordinate system of camera 108 and camera 116 to coordinate system 144, based on known position of these cameras in coordinate system 144.

Reference is made to FIG. 2A illustrating two trackable objects. Coordinate system 144 is realized in computer 130. Its origin can be realized at any location and in any orientation relative to support 128. In this example the X axis is perpendicular to the optical axis of camera 108 and parallel to support 128, and the Y axis is perpendicular to platform/support 128.

A coordinate system of a camera can be determined, for example, as having its origin at the center of the image sensor with X axis parallel to the sensor lines and Y axis parallel to the sensor columns, Z axis pointing at the lens. The position information of camera 108 in coordinate system 144 can be determined by the position of the center of its sensor and the plane orientation of the sensor (typically defined by the direction of a vector perpendicular to the plane of the sensor) in coordinate system 144. Coordinates of a point in the head box space can be calculated from the position of the image of these objects on camera 108 sensor by using the image captured by camera 108 and provided to computer 130 and by using the lens information and geometrical optics. When a single camera is used for the head box, distance to the point can be calculated from focusing information of a motorized focusing lens, and if the lens has zoom capabilities, also from the zoom level or magnification information. Using face recognition algorithms to determine the location of the center of the pupils of the user supports determination of the center of the one or two pupil positions in coordinate system 144.

The position information of a point in the object box in coordinate system 144 can be determined in the same way. In this case, instead of pupil, it may be desired to locate the finite plane that is the screen area 124 of monitor 104. This can be done by providing computer 130 with the monitor parameters information (dimensions, colors, specific features) and using object recognition software such as SentiSight SDK available from Neurotechnology, Vilnius, Lithuania. In the case of a known object, such as a monitor, having its actual dimensions communicated to computer 130, with the camera sensor and lens information, computer 130 can calculate the position information of monitor 104 and screen 124 in coordinate system 144.

As shown in FIG. 2A, objects (such as monitors) can also be equipped with markers having any of shape, colors, light sources and retro reflectors that can be configured to further support the object recognition software by identifying the specific object and aid in calculating the object's position in space. In the case of a monitor, the markers can be displayed on the display area, generated by the monitor display capabilities. In this particular example monitor 104 has four markers 202, 204, 206 and 208 located at the corners of the frame of monitor 104. These markers can be any type of the above described markers. Computer 130 can store these markers and their geometrical position (and/or color, shape, size) and monitor 104 can be identified properly (because in this example it has four markers exactly). Positional information of monitor 104 can be extracted from the relative geometry and dimensions of the imaginary quadrilateral shape drawn between the four markers as it appears in the acquired image of camera 116 or using 2D-3D pose extraction methods such as described in Rosenhahn, B. "Foundations about 2D-3D Pose Estimation" and Wikipedia: "https://en.wikipedia.org/wiki/3D_pose_estmation" and Rosenhahen, B., Sommer G.: "Adaptive pose estimation for different correcsponding entities". In Van Gool, L. (ed) DAGM 2002, vol. 2449, pp. 265-273. Springer, Heidelberg (2002) and Daniel F. Dementhon, Larry S. Davis, "Model-based object pose in 25 lines of code", International Journal of Computer Vision June 1995, Volume 15, Issue 1, pp 123-141.

In the example of monitor 200, in addition to the four markers 212, 214, 216 and 218 placed at the corners, there is one additional marker 220. Such marker arrangements can be made unique to monitor 200 to facilitate use of object recognition software to unambiguously identify this monitor and also provide its position in space based on the geometry of the markers that is stored in computer 130 and available to the position calculation software.

FIG. 2B illustrates an example where four monitors 104, 240, 422 and 246 are clustered together to provide object 230. Three markers 232, 234 and 236 can be used to identify object 230, correlate it with geometrical information of this object stored in computer 130 so that images captured by camera 116 can be used by computer 130 to identify the object as the specific object 230. Computer 130 can calculate object 230 position in the desired coordinate system, such as for example coordinate system 144, using the stored geometrical information of object 230 alone or including markers 232, 234, 236. Computer 130 can also calculate the position of each of screens 124, 250, 252 and 256 in coordinate system 144 based on object 230 information stored in computer 130 (or stored anywhere else and retrievable by computer 130).

It would be appreciated that the monitors are not necessarily positioned in the same arrangement as in the example of FIG. 2B, the monitors are not necessarily of the same size and any of items 104, 240, 422 and 246 are not necessarily monitors. Any two or more items can constitute such an object by being positioned relative to each other in a definite known arrangement, allowing the object information to be stored in and used by computer 130.

In order to function, tracking system 100 must be calibrated. Calibration of the system creates a mapping between the gaze information extracted from user's 112 eyes (located in head box 162), and the gaze points of the user on certain objects (located in object box 164). Calibration of tracking system 100 is generally performed by providing calibration targets, typically in the space in front of the user that is further away from the user than tracking system 100. For each such target, the position of that target in coordinate system 144 is recorded, in association with gaze information from the user (typically the relations between his pupil and corneal reflection of light source 132, occasionally also location in the head box) as he or she looks at the target, the position of which is also recorded. By spreading such targets over the relevant space in the object box, with such target density as might be desired for accuracy purposes, the entire desired space is mapped and the calibration is completed. There now exists a direct mapping between gaze information taken from user 112, and corresponding gaze points (and line of gaze) in the space of the object box. Now, for any gaze information retrieved from user 112, the recorded data (through the calibration mapping) is used to determine the corresponding gaze point. In a simple implementation, the nearest stored gaze data can be retrieved and the associated target known position would indicate the point where the gaze line is passing through. With known position of the user's eye, the gaze line is determined by calculating the equation of a line passing through two known points. In another example, interpolation parameters can be extracted for the current gaze data relative to similar data previously recorded during the calibration. These similar recorded gaze data have corresponding gaze points in the object box that can be used to create interpolated values that estimate the point in space associated with this particular gaze data retrieved. In a more sophisticated example, linear regression may be performed during calibration to map the gaze data recorded from the user 112 to the known location of the calibration targets. The coefficients of this linear regression can then be used to translate all future gaze data from user 112 into gaze points in the object box. Such methods of eye tracking calibration are generally known in the arts.

FIG. 3A is an illustration of the calibration concept. In FIG. 3A, the target is a cross marker 304 displayed on screen 124 of monitor 104. The image displayed on screen 124 that includes target 304 can be provided from computer 130 or from another source. If the image is provided by another source, the other source can be in communication with computer 130 so that computer 130 can "request" displaying this target or another target and computer 130 is also informed that the requested target is displayed and calibration in reference to this target can commence. The location of target 304 in coordinate system 144 is known to computer 130 by knowing the position and information of monitor 104 (using positioning camera 116 and the object tracker functionality) and having the information of the location of target 304 within screen 124. Computer 130 can also detect that the desired target is displayed and its location on screen 124 using the image from camera 116 with suitable object recognition software. User 112 gazes at target 304, thus creating gaze line 306 from his eye 312 position to target 304 position. Camera 108 captures the image of the user's eye 312 including corneal reflection from illumination 132. Computer 130 calculates from the image eye tracking parameters such as position of center of the pupil and center of the corneal reflection for eye position 312 in coordinate system 144. This can be done using the sensor information of camera 108 in coordinate system 144, and focusing and zoom parameters of the lens so that 3D position of eye 312 in coordinate system 144 becomes known to computer 130. Stereoscopic methods can also be used for this purpose and will be described below. Camera 116 captures the image in front of it, including the image of monitor 104 and the image of target 304. Computer 130 uses this image to identify monitor 104 using any of the above mentioned methods (for instance, if the monitor has markers, using these markers) and using the known stored geometry of monitor 104 to determine the position of screen 124 in coordinate system 144. Computer 130 also uses this image to identify the target image (using for example cross-correlation methods for known target shape, over the image area associated with screen 124) and calculate its position in coordinate system 144. The monitor screen plane's position and orientation in coordinate system 144 and the target direction in coordinate system 144 allows computer 130 to calculate the intersection point of line of view 310 from camera 116 with the plane of screen 124, thus identifying the 3D position of target 304 in coordinate system 144. Stereoscopic methods can also be used for this purpose instead or in conjunction with markers or object geometry as will be described below. The data calculated from camera 108 image (position of eye 312 in coordinate system 144) and the data calculated from camera 116 image (position of target 304 in coordinate system 144) establish gaze line 306 information in coordinate system 144. The gaze line information can be recorded and used in association with the data calculated from the images captured by camera 108 and camera 116, to provide one calibration point.

This process is repeated with additional targets displayed in different positions on screen 124 to provide the desired coverage of the space available by screen 124 size, to support the desired accuracy at any point. It would be appreciated that although the calibration is described in reference to a single eye 312 position, the eye tracking algorithms typically contain features aimed to compensate for movements of the head (and eye). The calibration can also include different eye positions over the useful volume in front of camera 108.

If the calibration has not covered the entire tracking range of the eye tracker because monitor 104 does not cover the solid angle of the tracking range, monitor 104 can now be moved to another location in object box 164 and the calibration can be continued for gaze lines not calibrated before (essentially, repeating the above described procedure for different locations of monitor 104). This can be repeated until the entire span of object box 164, or any desired part of it, is calibrated to provide the desired coverage and resolution of calibration within object box 164.

Multiple monitors can be placed in different locations to provide a spread of calibration targets over a larger part of object box 164.

Monitor 104 could also be positioned close enough to camera 116 so as to cover the entire solid angle of the tracking range with screen 124 in one position. The entire tracking range can be calibrated with this arrangement without moving the monitor.

Instead of using monitor 104 to generate the targets for the calibration, targets can be distributed in the room in a manner that provides the desired number and distribution of calibration targets within object box 164. An example is described in reference to FIG. 3B.

In FIG. 3B, two of the room walls are indicated by numeral indicators 330 and 332. A cabinet in the room (or any other furniture or object) is represented by numeral indicator 344. The star-shaped elements such as 324 and 334 represent the calibration targets. The calibration targets can be identical or differentiable through different graphic of any desired shape and color. They can even be light sources such as LEDs of different color or operated in various ON/OFF sequences patterns, and can have intensity that changes with time. A target can be constructed of a cluster of LEDs. The cluster can be arranged in any spatial distribution, ON/OFF sequence and color. The targets can be retro reflectors that reflect light from illumination source 152 (FIG. 2A). They can be projected upon the walls and other objects of the room in any shape, image, color, ON/OFF sequence and brightness. The position of the targets in coordinate system 144 can be determined using the image of camera 116 combined with lens focus/zoom information. Alternatively, the geometrical arrangement of the targets in the room can be provided to computer 130. By evaluating the image captured by camera 116 and knowledge of the calibration targets arrangement in space, computer 130 can support calculation of the position of each target in coordinate system 144. The calibration of the line of sight for each target is conducted similar to as it was described above. Performing calibration with a number of targets such as 324 dispersed in the room of FIG. 3B can be done without monitor screen 124. It is enough to position the eye tracker so that positioning camera 116 captures targets to cover the gaze angles range to be calibrated, using any subgroup of the targets or all of them. Targets should be distributed with sufficient density. The more the targets are near each other, the more accurate the calibration is. To increase accuracy with a given set of targets, the eye tracker can be moved from one calibration session to the other so that the new position of the targets in the field of view of positioning camera 116 is different from the previous session, thus providing a virtually higher density of targets to contribute for better accuracy of the calibration. This step can be repeated as many times as desired. It would also be appreciated that the usage of targets for calibration as explained can be done with any positioning camera, regardless of where it is mounted and regardless of the coordinate system that is associated with it.

For example, target light sources can be connected to a drive box 340 that is connected to computer 130. Drive box 340 can be controlled by computer 130 and can be configured to control the operating parameters of each of the targets.

In the case of a projector, computer 130 can be connected to projector 342 to control it to project target images on any of the room walls, ceiling, floor and furniture or simply illuminate a specific graphical target at a specific time.

In one method, when the targets' relative geometrical data is not known to the system, every target that is used for calibration must be within the tracking range and also the object box.

In another method, when the targets' relative geometrical data is known to the system, it is enough (1) for the object tracker to identify a minimal number of targets (typically 3 but in special arrangements 2 may be enough, for example when the positioning camera height and angle relative to the floor is fixed) and (2) for the system to know which target is serving as the current calibration target. With this the system can calibrate also for targets that are outside the object box but are inside the tracking range. When the system is using, for example, LEDs or a projector to provide a calibration target, the calibration target in use can be known to the system.

It would be appreciated that when using pose detection techniques to determine the position of the targets in a coordinate system, the position of the targets relative to each other need to be known to the system. This can be done by design of the location of the targets.

The detection of position of any of the user's eye, the calibration targets, the markers of objects and objects in coordinate system 144 can also be done using stereoscopic imaging as illustrated in FIG. 4. Cameras 108 and 408 have head boxes that are at least partially overlapping (not shown in FIG. 4). In the overlapping volume the images from cameras 108 and 408 are used by computer 130 to extract directions to eye 312 and the corresponding distances to the eye from each camera, so that the position of the eye in coordinate system 144 is determined. Extraction of a point position in a 3D space by computer vision triangulation techniques is well known in the art and described in Wikipedia (www.wikipedia.com) under the value "Triangulation (computer vision)".

When any of markers, targets object detection are used in combination with stereo imaging, stereo imaging can replace technologies mentioned above (such as position in the image, focusing and pose detection methods) or add accuracy to determining items locations. Stereo imaging is also less sensitive to specular blinding reflection from glasses that may be used by the user, since stereo images are obtained by use of two cameras placed at arbitrary locations in the room and naturally viewing the scene and the user at different angles.

The two images comprising a stereoscopic pair typically contain the same face but at different pixel positions, therefore, center point of each face can be used as a point of interest to extract the distance to it from the reference coordinate point or system. This can be done using known stereo triangulation principles and equations.

The stereo system, by definition, comprises a duplicity of system components (at least duplication of cameras) so that under certain circumstances one component can be selected or given priority over the other component e.g., to avoid specular blinding reflection from glasses.

The same concept applies to stereoscopic imaging of the object. In FIGS. 1 through 4 camera 116 can be used alone (or with camera 416 for stereoscopic capability) to capture an image of an object such as monitor 104 that can have markers such as 232 and computer 130 can use these images to determine the object position in any selected coordinate system such as 144.

Reference is made now to FIG. 5 illustrating positioning camera 500 of the object tracker attached to monitor 104 (or anywhere, in a fixed relation to monitor 104). In this example of the invention, the tracked object is the eye tracker. Computer 130 can receive images captured by camera 500 through a direct cable connection, or wireless. In some examples the captured images can be fed to computer 130 on storage media such as for example a flash disk or in any other way. Computer 130 stores camera 500 information (lens parameters, sensor parameters and sensor position relative to monitor 104). Monitor 104 geometry is also stored in computer 130. Monitor 104 and camera 500 geometries together with other information can be provided and stored relative to coordinate system 544 that is fixed relative to camera 500 and monitor 104. Also coordinates of camera 108 or support 128 or markers 502 and 504 (located on any of the support assembly, camera 108 and illumination 132, all assembled together in fixed relations) within the associated coordinate system 144, are stored in computer 130. Using the image captured by camera 500, computer 130 can use the information of the support 128 and eye tracker assembly position to calculate the relative position of coordinate system 144 in coordinate system 544. In other words, computer 130 can calculate the transformation between coordinate systems 144 and 544. With this information, without the need for a camera to cover monitor 104, the intersection point of the gaze line calculated from the image of camera 108 with screen plane 124 (or any known object surface) can be calculated in any coordinate system, 544, 144 or any other coordinate system with a known transformation to at least one of 544 and 144.

It would be appreciated that not all elements located on support 128 are required and that different elements can complement each other. For example, storing the parameters of camera 108 sensor and optics together with the camera's external geometry in computer 130 can work together with object recognition software and a coordinate system specified in reference to camera 108 to provide all the necessary information to determine the cross point of the gaze line with the object.

Calibration is based on an assumption that calibration targets will also be included in one of the coordinate systems so that all relevant system information can be used in calculating the gaze lines and intersection of the gaze lines with objects. This is provided for calibration targets displayed on the object in known positions relative to the object coordinate system (such object is for example, monitor 104 and coordinate system 544). Yet, in the example of FIG. 5, calibration targets such as 324 (of FIG. 3B and FIG. 4) have no path to be included in coordinate systems 144 or 544 using any of the above methods since they are not visible by any of the system cameras (108 and 500) and the relative position of these targets is not known to the system. To overcome this and to calibrate for an object box that is larger than the solid angle provided by screen 124 area, calibration cycles can be repeated by moving monitor 104 to a different position for each calibration cycle until the desired object box dimension is covered. Such a displacement would generally be in X-Y direction although displacement in Z direction does not affect the process. For each positioning camera 500 captures the image of the markers associated with support 128 assembly and provides computer 130 the necessary information to calculate the transformation between coordinate systems 144 and 544. This information, in cooperation with the calibration targets position in coordinate system 544, supports calibration of the gaze lines.

Also in this example lens information (zoom, focus) can be used to determine the position of captured objects in coordinate system 544, and an additional camera can be added to camera 500 to utilize stereoscopic benefits in determination of the position of captured objects in coordinate system 544 or pose determination methods can be used in association with data stored for use by computer 130 of at least a part of markers 502 and 504 location relative to each other. It would be appreciated that these methods can be applied with any of the previously given examples.

FIG. 6A is an illustration of an additional exemplary embodiment of the invention where camera 600 is used to capture components such as an eye tracking camera or an eye tracking assembly and an object such as a monitor. In the example of FIG. 6A camera 600 captures monitor 104 (the object) and at least a part of the elements located on support 128, including what is needed to identify the position of the eye tracker camera coordinate system (or the position of a coordinate system fixed to the eye tracking camera, such as 144). The image captured by camera 600 is transferred to computer 130. By using any of the above described methods such as object recognition or markers and stored information, computer 130 calculates the position of the object (monitor 104) in camera's 600 coordinate system 644 and also the position of coordinate system 144 in coordinate system 644. Practically, this provides the transformation between the two coordinate systems. Computer 130 can use this information to calculate the intersection point of the gaze line given in coordinate system 144 with the object (monitor 104 in this example).

It would be appreciated that any coordinate systems may be selected for the calculation of the intersection point of the gaze line with the object and coordinate system 644 is selected above only as example.

Calibration can be done in the same way as described in reference to FIG. 5 by moving monitor 104 in the object box. In the example of FIG. 6A, if camera 600 captures additional calibration targets, for example such as targets 324 of FIG. 3B and 4, such targets can be used for calibration as described above.

More cameras, for example such as camera 602, can be added.

Although a plurality of cameras can be added, and each of the cameras can also have pan and tilt functions, the description will refer to one additional camera where use of a plurality of cameras is analogous and well understood by those skilled in the art.

The transformation between coordinate system 646 of camera 602 and coordinate system 644 of camera 600 can be known and stored in computer 130. In some examples, the transformation can also be calculated by computer 130 using known stored data that is captured by both cameras. An example can be capturing of targets 502 and 504 by both cameras. With known geometry of these targets stored in computer 130, the position of each camera relative to these targets can be calculated and therefore also the transformation between coordinate systems 644 and 646.

It is not necessary that all of the plurality of cameras will capture the same items to support the calculation of the transformation between the coordinate systems of the cameras. It is also not necessary to know in advance the transformations between the coordinate systems of cameras 600, 602 and 604. This can be extracted through images captured by the cameras. For example, camera 600 can capture the elements located on support 128, camera 602 can capture the elements located on support 128 and object 104 and camera 604 can capture the elements located on object 104. The elements located on support 128 can be used by computer 130 to calculate the transformation between coordinate systems 644 and 646 because these elements are commonly viewed by both cameras. Camera 602 image can be used by computer 130 to calculate the transformation between coordinate systems 644 and 648 because it captures both objects 128 and 104. Calculated transformations between coordinate systems 644 and 646 using object 128 and between coordinate systems 646 and 648 using object 104 facilitate calculation of the transformation between coordinate systems 644 and 648. The transformation between the coordinate systems 644, 646 and 648 and coordinate system 144 can also be supported through, for example, camera 600 and computer 130 as described above. Therefore all collected information can be used with any one desired coordinate system to provide the point of intersection of the gaze line with the object.

Multiple cameras can be used to cover any part or the entire space in a room so that, as long as an object is captured by at least one camera, any object location can be used, any calibration target can be used and any camera pair with at least partially overlapping field of view can be used for stereoscopic benefits in the overlapping field of view.

Multiple cameras with overlapping fields of view can be used to improve the accuracy of determination of items posited in the common field of view of the cameras. Multiple cameras with overlapping field of view can also be used to provide backup in case the line of site of a first camera is disturbed by a person or any other object in the room, the second or third camera that is located in a different position can provide the information obscured from the other camera.

Reference is made now to FIG. 6B illustrating an example where positioning cameras 116, 616 and 618 are shown to be aimed at different directions so as to provide three object boxes that together cover a larger volume of the room than camera 116 alone. Positioning cameras 116, 616 and 618 can be used with or without positioning cameras 600, 602 and 604 (in case all cameras are fixed relative to one reference such as support 128, markers 502 and 504 are not required). Cameras 116, 616 and 618 are distinguished from cameras 600, 602 and 604 in their arrangement in a fixed position relative to the elements located on support or plate 128. In a more general approach, cameras 116, 616 and 618 are arranged in a fixed position relative to coordinate system 144. Therefore, with cameras 116, 616 and 618 the step of calculating the transformation between a camera coordinate system and coordinate system 144 is not necessary since the transformation between the coordinate systems (unlike for cameras 600, 602 and 604) is fixed and is stored in computer 130.

It would be appreciated that any combination of positioning cameras can be used, whether in a fixed position relative to another item or not and that the number of positioning cameras and eye tracker cameras can be different.

Certain users can wear spectacles that enhance their vision capabilities. Often users wear protective glasses. When illuminated at a certain angle, such glasses can produce a specular reflection of the illumination supplied by a single illumination source, for example, source 132. Such specular reflection can complicate the operation of eye tracker 108. This complication can be alleviated by using more than one light source illuminating the user 112 at different angles.

Reference is made now to FIG. 7 providing an example of use of more than one light source providing corneal reflection. In this example, in addition to light source 132 shown in previous figures, one or more additional light sources such as light source 732 are provided. Light source 732 is located at a different position than light source 132 relative to camera 108. Light source 732 illuminates the user and the objects present in the illuminated space at an angle different than the one light source 132 illuminates. In case light from light source 132 is reflected to camera 108 (for example, specular reflection from eye glasses of user 112) in a way that the corneal reflection captured by camera 108 is not detectable or not usable for the purpose of eye tracking, light source 132 can be turned OFF and light source 732 illuminating at a different angle can be turned ON to support continuation of eye tracking using the corneal reflection that is now visible to the eye-tracker. Generally, a larger number than two of illumination sources arranged at different angles can be used. It would be appreciated that the two light sources should be arranged so that they provide, each one, a corneal reflection for at least one same gaze line over at least a part of the gaze range.

Periodical switching between the two or more light sources is also a possible operation mode of the eye tracker. Alternatively, computer 130 can be configured to detect eye tracker blinding and automatically switch between different light sources. Since light reflection intensity is polarization dependent, each or at least one light source can be polarized, further simplifying alleviation of the eye tracker blinding.

For the purpose of calibration, when user 112 is performing calibration for a target such as target 334, the calibration can be done first with one light source and then with the other light source. A calibration map is generated for each of the two light sources (or any other number of light sources). It is appreciated that calibration process can be selecting one calibration target and for the selected target calibrate sequentially for at least some of the light sources. Alternatively, it is possible to select a light source and then calibrate sequentially through at least a part of the calibration targets or any other order mixing calibration targets and light sources. It would be appreciated that switching between light sources to calibrate multiple light sources with one target (user 112) can be done without the user being aware of the light sources switching during the calibration, especially, if the light source is not in the visible range (such as infra-red light source).

Reference is made to FIG. 8 illustrating an example of multiple eye tracking input units. One of the eye tracking input units is camera 108 with corneal reflection light source 132 mounted on plate or support 128 associated with coordinate system 144 and head box (not shown—162 of FIG. 1B). Camera 108 is connected to computer 130 via line 160, although it can be a wireless connection. The second eye tracking input unit is camera 808 with corneal reflection light source 832 mounted on plate 828 associated with coordinate system 844. Camera 808 is associated with a corresponding head box (not shown) and connected to computer 130 via line 860. One object is demonstrated in this example, monitor 104 with its associated coordinate system 544.

The transformation between the three coordinate systems 144, 844 and 544 is calculated by computer 130. Computer 130 receives images captured by camera 116 that include monitor 104. Using stored information of monitor 104 the images are analyzed to calculate the position of monitor 104 in coordinate system 144. The position of coordinate system 544 in coordinate system 144 becomes known and transformations between 144 and 544 coordinate systems can be calculated by computer 130.

In the same way, by analyzing images captured by camera 816, the position of coordinate system 544 in coordinate system 844 can be calculated by computer 130. Now transformations between 844 and 144 coordinate systems can also be calculated by computer 130 using coordinate system 544 that is common to both 144 and 844 coordinate systems. In a similar way the coordinate transformations between any two of the three coordinate systems 144, 544 and 844 can be calculated by computer 130.

With this arrangement in place, user 112 can move around outside of the head box of camera 108 and into the head box of camera 808 while his gaze line is calculated in the relevant coordinate system, such as coordinate system 144 when he is in the head box of camera 108 and coordinate system 844 when he is in the head box of camera 808. In any of the cases, the gaze line can be transformed to coordinate system 544 and the gaze point can be extracted from the intersection of the gaze line and screen 124 in coordinate system 544.

It would be appreciated that this example is not limited to two eye tracker cameras and a plurality of such eye tracker cameras can be distributed in the space to create as many head boxes as desired, and distributed as desired. Also the number of objects that can be tracked is not limited.

It would also be appreciated that the number of eye tracker cameras does not need to be equal to the number of positioning cameras. For example, if the user's position is limited to a relatively small volume one or two eye tracker cameras can cover the required space to capture the gaze line and, at the same time, a plurality of positioning cameras can be positioned to cover a large space where objects might be present as demonstrated in FIG. 6B. Part of or all the methods above can be used to acquire the gazing and the object information so as to calculate the gazing point. In the same way, if the user moves through a large volume and the objects are constrained to a small volume, a plurality of eye tracker cameras can be used with one or two positioning cameras.

It would also be appreciated that in all the examples where the gaze point is determined on an object having display capabilities such as a monitor, since the location of the gaze point on the display surface is known and the display surface is known, the gaze point can be displayed on the display using some kind of graphics overlay, such as a cross mark. Also, when the object has other controllable indicators on the surface for example, such as light emitting diodes (LED), when the gaze point is near or on a LED, the LED can be turned on (or off) so to indicate that the gaze point is there.

It would be appreciated that the current invention is not limited to the application of surgical procedures, which is merely used as a primary example. The system and methods described apply to a number of activities which may benefit from eye tracking with expanded range, including military applications, gaming, academic research and marketing research. In addition, it should be noted that many applications which were previously unsuitable for eye tracking due to the typical motion constraints are likely to reveal themselves, expanding the imaginative and creative uses of this technology.

For such non-surgical applications, the object box can be defined by an angular span in the environment. Calibration can be performed by shifting a monitor that covers only part of the angular span to various positions in the object box, and performing a calibration procedure as previously described in each position. In such a way, the user could complete the calibration process in a number of sessions, essentially allowing the system to encompass an object box of any size where a larger object box necessitates a longer calibration process. Once calibrated, the system can work anywhere: either where it was calibrated, or at any other location relative to the object or objects, so long as the gaze range includes the object for which the gaze point is pursued and, in accordance with the above description, the positioning scheme is implemented.

In this scenario, the environment can be any room or space where eye tracking is desired, for example: an operating room for a surgical application; a combat simulator environment for a military application; a living room for a gaming application; a supermarket aisle for a marketing research application, etc.

It will be appreciated by persons skilled in the art that the present invention is not limited to what has been particularly shown and described hereinabove. Rather the scope of the present invention is defined by the appended claims and includes combinations and sub-combinations of the various features described hereinabove as well as variations and modifications thereof which would occur to persons skilled in the art upon reading the foregoing description.

The invention claimed is:

1. A system for evaluating a point of gaze of a user on an object, said system comprising:
   an eye tracker, comprising:
   at least one eye tracker camera associated with a first 3D coordinate system that is fixed relative to said at least one eye tracker camera;
   a light source configured to provide corneal reflection from at least one of said user's eyes; and
   at least one computer;
   at least one positioning camera associated with a second 3D coordinate system that is fixed relative to said at least one positioning camera; and
   at least one object, wherein geometrical data of said at least one object is stored in a storage device accessible to the at least one computer;
   wherein any combination of said at least one computer is configured to determine:
   (a) a gaze line of said user relative to said first 3D coordinate system, based on an image received from said at least one eye tracker camera;
   (b) the position of said at least one eye tracker camera relative to said second 3D coordinate system, thereby determining the position of one 3D coordinate system in the other 3D coordinate system, based on an image received from said at least one positioning camera;
   (c) the position of said at least one object relative to said second 3D coordinate system based on said image from said at least one positioning camera and said stored geometrical data of said at least one object; and
   (d) a gaze point calculated as the intersection of said gaze line with a surface of said object in any 3D coordinate system, based on said gaze line in said any 3D coordinate system and said at least one object's position in said any 3D coordinate system;
   wherein a first positioning camera is configured to determine the position of said at least one eye tracker, said first positioning camera associated with a second coordinate system fixed relative to said first positioning camera; wherein a second positioning camera is configured to determine the position of said at least one object, said second positioning camera associated with a third coordinate system fixed relative to said second positioning camera; and wherein the intersection of a gaze line determined by said at least one eye tracker with said at least one object is determined based on a transformation between said second coordinate system and said third coordinate system.

2. The system of claim 1, wherein said at least one object comprises at least two objects; wherein said at least two objects are configured to be arranged in fixed positions relative to each other.

3. The system of claim 1, wherein said at least one object is a monitor, said monitor is configured to display at least one marker.

4. The system of claim 1, wherein said at least one positioning camera comprises at least two positioning cameras; said at least two positioning cameras are configured to enable determining the position of said at least one object using stereoscopic methods.

* * * * *